P. KEELEY.
HORSE-POWERS.
No. 194,688. Patented Aug. 28, 1877.
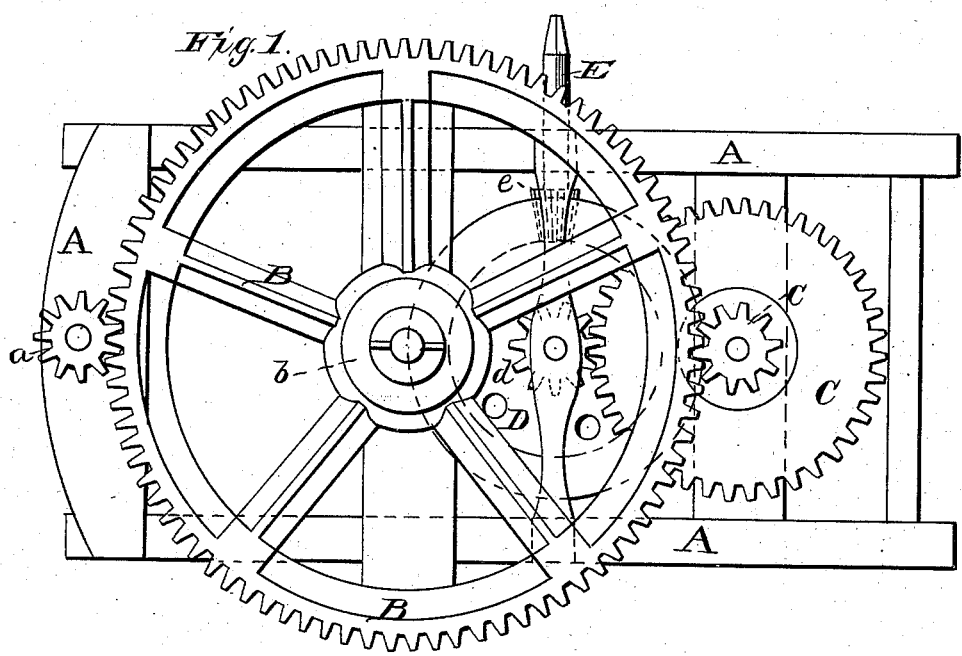
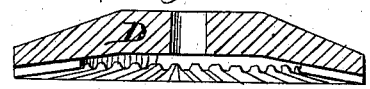
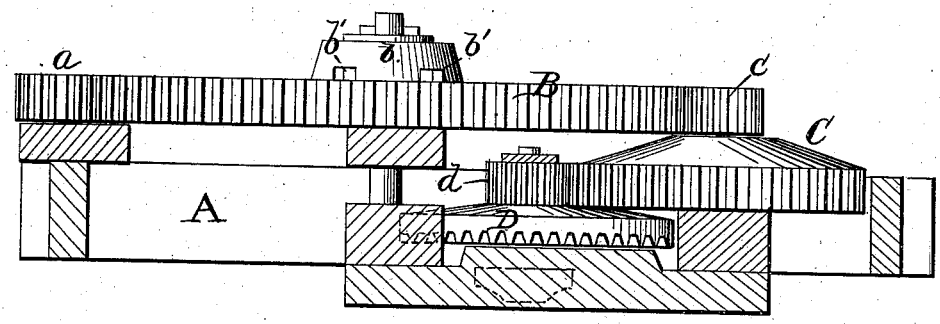
WITNESSES
F. L. Ourand
M. Gardner
INVENTOR
Philip Keeley,
by L. Deane.
ATTORNEY.

UNITED STATES PATENT OFFICE.

PHILIP KEELEY, OF ST. MARY, MINNESOTA.

IMPROVEMENT IN HORSE-POWERS.

Specification forming part of Letters Patent No. 194,688, dated August 28, 1877; application filed May 7, 1877.

*To all whom it may concern:*

Be it known that I, PHILIP KEELEY, of St. Mary, county of Waseca, and State of Minnesota, have invented certain new and useful Improvements in Horse-Powers; and I do declare the following to be a full, clear, and accurate description of the same, reference being had to the accompanying drawing, which forms a part of the specification, in which—

Figure 1 is a top-plan view. Fig. 2 is a side elevation with a part of the frame taken away; Fig. 3 a section of the wheel, concave on its under side, which drives the tumbling bar or rod.

The design of the present invention is to produce such improvements in horse-powers for thrashing and other machines that an increased motion can be obtained by my device, with less speed of the horse, over what can be attained by any other like device now in use; and to this end it consists more particularly in the special construction, arrangement, and combination of the several wheels making up my said horse-power, with their attendant operative parts, all as will now be more in detail set out and explained.

In the drawing, A denotes any usual frame for this purpose, and it may be mounted on trucks or wheels. B is the main or driving wheel, and sometimes called the "master or bull wheel." It is suitably mounted and journaled in said frame A. In the hub *b* of said wheel are sockets *b'* for the insertion of the ends of the shafts or driving-bars. The outer edge of this wheel has cogs which mesh into cogs on pinion *c* projecting up from wheels C, which wheel is also suitably mounted and journaled in said frame A, but in such relation to wheel B as to come on a horizontal plane below it, and thus allowed to revolve, in part, under it. The cogs in the periphery of this wheel C mesh into cogs on the pinion *d* extending upward from wheel D. This wheel D is likewise suitably mounted and journaled in frame A and under wheel B, and, being in lower horizontal plane than wheel C, can revolve under it, in part. This wheel D is concave on its under side, and the cogs made on the outer part of its face here mesh with those on the inclined pinion *e* upon the tumbling rod or bar E, whence said bar or rod derives its motion. Upon the upper part of the frame A, that is opposite to the wheel C, is provided a balance-cog, *a*, meshing into cogs on B, and constituting a balance for the wheel.

It will be observed that wheel B has a considerably larger diameter than wheels C or D, these last being, in fact, in this particular, of nearly like size. By means of such construction and the concavity of the wheel D on its under side, and in the interposition of the toothed pinion, as described above, and the inclined pinion on the tumbling bar or rod, I am enabled to produce the very best results in multiplying the speed generated by this power relative to the force used, and I can gain results in this direction superior to anything which has heretofore been attained by any like device or mechanism with which I am acquainted.

The device, as I have above described it, is in construction very compact and exceedingly strong, very cheaply made and easy of repair, which points are each and all of great moment in devices of this sort.

In this specification I do not intend to assert that it is new in such devices as this to have three wheels or several wheels connected together to transmit or multiply power, and, therefore, I have been particular to state the exact points of novelty in the present instance, that the distinguishing characteristics of my invention may be readily recognized over any other device of the like kind before made or used.

Having thus described my invention, what I consider new, and desire to secure by Letters Patent, is—

The horse-power herein described, consisting of the wheels B and C, pinion *c*, wheel D, concave on its under side, pinion *d*, and tumbling bar or rod E, with its pinion *e*, the whole properly mounted and journaled in frame A, and constructed and combined substantially as and for the purposes set forth.

PHILIP KEELEY.

Witnesses:
JNO. C. TROWBRIDGE,
H. V. WINTERS.